US008805143B2

(12) United States Patent
Tatat et al.

(10) Patent No.: US 8,805,143 B2
(45) Date of Patent: Aug. 12, 2014

(54) OPTICAL-FIBER CABLE HAVING HIGH FIBER COUNT AND HIGH FIBER DENSITY

(75) Inventors: Olivier Tatat, Sangatte (FR); Jean-Marc Testu, Antibes Juan les Pins (FR)

(73) Assignee: Draka Comteq, B.V., Amsterdam (NL)

( * ) Notice: Subject to any disclaimer, the term of this patent is extended or adjusted under 35 U.S.C. 154(b) by 767 days.

(21) Appl. No.: 12/907,265

(22) Filed: Oct. 19, 2010

(65) Prior Publication Data

US 2011/0091171 A1    Apr. 21, 2011

Related U.S. Application Data

(60) Provisional application No. 61/252,951, filed on Oct. 19, 2009.

(51) Int. Cl.
*G02B 6/44*    (2006.01)

(52) U.S. Cl.
CPC ............. *G02B 6/4433* (2013.01); *G02B 6/441* (2013.01)
USPC ............ 385/112; 385/109; 385/106; 385/113

(58) Field of Classification Search
CPC ................................ G02B 6/441; G02B 6/443
USPC .................................................. 385/100–114
See application file for complete search history.

(56) References Cited

U.S. PATENT DOCUMENTS

| | | |
|---|---|---|
| 4,838,643 A | 6/1989 | Hodges et al. |
| 4,852,968 A | 8/1989 | Reed |
| 5,044,724 A | 9/1991 | Glodis et al. |
| 5,574,816 A | 11/1996 | Yang et al. |
| 5,717,805 A | 2/1998 | Stulpin |
| 5,761,362 A | 6/1998 | Yang et al. |
| 5,848,212 A * | 12/1998 | Wagman ................... 385/111 |
| 5,911,023 A | 6/1999 | Risch et al. |
| 5,982,968 A | 11/1999 | Stulpin |
| 6,002,824 A * | 12/1999 | Paborn et al. ............. 385/106 |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |

(Continued)

FOREIGN PATENT DOCUMENTS

| | | |
|---|---|---|
| EP | 1921478 A1 | 5/2008 |
| EP | 2312359 A1 | 4/2011 |

(Continued)

OTHER PUBLICATIONS

Hogari et al, "Novel Optical Fiber Cables With Ultrahigh Density", Journal of Lightwave Technology, vol. 26, No. 17, Sep. 1, 2008, pp. 3104-3109.*

(Continued)

*Primary Examiner* — Hemang Sanghavi
(74) *Attorney, Agent, or Firm* — Addition, Higgins, Pendelton & Ashe, P.A.

(57) ABSTRACT

Disclosed is a reduced-diameter optical-fiber cable that possesses a high fiber count and a high cable fiber density.

29 Claims, 1 Drawing Sheet

(56) References Cited

U.S. PATENT DOCUMENTS

| | | | |
|---|---|---|---|
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,424,770 B1 | 7/2002 | Nothofer | |
| 6,493,491 B1 | 12/2002 | Shen et al. | |
| 6,496,628 B1 | 12/2002 | Opel et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,749,446 B2 | 6/2004 | Nechitailo | |
| 6,901,197 B2 | 5/2005 | Hasegawa et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,961,508 B2 | 11/2005 | van Eekelen et al. | |
| 7,045,010 B2 | 5/2006 | Sturman, Jr. | |
| 7,095,940 B2 | 8/2006 | Hayami et al. | |
| 7,155,099 B2 | 12/2006 | Broderick et al. | |
| 7,162,128 B2 | 1/2007 | Lovie et al. | |
| 7,228,040 B2 | 6/2007 | Nakajima et al. | |
| 7,233,728 B2 | 6/2007 | Aikawa et al. | |
| 7,239,784 B2 | 7/2007 | Hayami et al. | |
| 7,292,762 B2 | 11/2007 | Guan et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,433,566 B2 | 10/2008 | Bookbinder et al. | |
| 7,444,838 B2 | 11/2008 | Pickrell et al. | |
| 7,450,806 B2 | 11/2008 | Bookbinder et al. | |
| 7,450,807 B2 | 11/2008 | Bickham et al. | |
| 7,483,613 B2 | 1/2009 | Bigot-Astruc et al. | |
| 7,515,795 B2 | 4/2009 | Overton et al. | |
| 7,526,166 B2 | 4/2009 | Bookbinder et al. | |
| 7,526,169 B2 | 4/2009 | Bickham et al. | |
| 7,526,177 B2 | 4/2009 | Matthijsse et al. | |
| 7,555,186 B2 | 6/2009 | Flammer et al. | |
| 7,555,187 B2 | 6/2009 | Bickham et al. | |
| 7,567,739 B2 | 7/2009 | Overton et al. | |
| 7,567,742 B2 | 7/2009 | Pickrell et al. | |
| 7,570,852 B2 | 8/2009 | Nothofer et al. | |
| 7,574,088 B2 | 8/2009 | Sugizaki et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,873,249 B2 | 1/2011 | Kachmar et al. | |
| 7,974,507 B2 * | 7/2011 | Lovie et al. | 385/113 |
| 8,116,604 B2 | 2/2012 | Bonicel et al. | |
| 8,467,650 B2 | 6/2013 | Overton et al. | |
| 2003/0053771 A1 | 3/2003 | Bourget et al. | |
| 2003/0102043 A1 | 6/2003 | Field | |
| 2007/0077016 A1 | 4/2007 | Bickham et al. | |
| 2007/0183726 A1 | 8/2007 | Nothofer et al. | |
| 2007/0274647 A1 * | 11/2007 | Pizzorno et al. | 385/113 |
| 2008/0056654 A1 | 3/2008 | Bickham et al. | |
| 2008/0166094 A1 | 7/2008 | Bookbinder et al. | |
| 2008/0292262 A1 | 11/2008 | Overton et al. | |
| 2008/0304800 A1 | 12/2008 | Bickham et al. | |
| 2009/0060437 A1 | 3/2009 | Fini et al. | |
| 2009/0126407 A1 | 5/2009 | Bookbinder et al. | |
| 2009/0154888 A1 | 6/2009 | Abbott, III et al. | |
| 2009/0169163 A1 | 7/2009 | Abbott, III et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0254653 A1 | 10/2010 | Molin et al. | |
| 2010/0266249 A1 | 10/2010 | Bonicel et al. | |
| 2010/0310218 A1 | 12/2010 | Molin et al. | |
| 2011/0026889 A1 | 2/2011 | Risch et al. | |
| 2011/0044595 A1 | 2/2011 | Sillard et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0091171 A1 | 4/2011 | Tatat et al. | |
| 2011/0110635 A1 * | 5/2011 | Toge et al. | 385/102 |

FOREIGN PATENT DOCUMENTS

| | | |
|---|---|---|
| WO | 2006/034722 A1 | 4/2006 |
| WO | 2009/062131 A1 | 5/2009 |
| WO | 2009/064381 A1 | 5/2009 |
| WO | 2010/053356 A2 | 5/2010 |

OTHER PUBLICATIONS

Draka Comteq product specification, "Enhanced Single Mode Fiber (ESMF)," (May 2009) pp. 1-2.
Draka Comteq product specification, "BendBright® single-mode optical fiber," (May 2009) pp. 1-2.
Draka Comteq product specification, "BendBrightXS® single mode optical fiber," (May 2009) pp. 1-2.
Draka Comteq product specification, "BendBright-EliteTM single-mode optical fiber," (May 2009) pp. 1-2.
U.S. Appl. No. 61/252,941, for a High-Fiber-Density Optical-Fiber Cable, Oct. 19, 2009, pp. 1-29.
U.S. Appl. No. 61/177,996 for a Reduced-Diameter Optical Fiber, May 13, 2009, pp. 1-57.
U.S. Appl. No. 61/248,319 for a Reduced-Diameter Optical Fiber, Oct. 2, 2009, pp. 1-99.
Draka Comteq product specification, "FTTH Outdoor Distribution Flextube Cable, BendBright XS Fibre," (Jan. 2011) pp. 1-2.
European Search Report and Written Opinion in counterpart European Application No. 09290799.7 dated Apr. 7, 2010, pp. 1-6.
Office Action in counterpart European Application No. 09290799.7 dated Nov. 9, 2011, pp. 1.

* cited by examiner

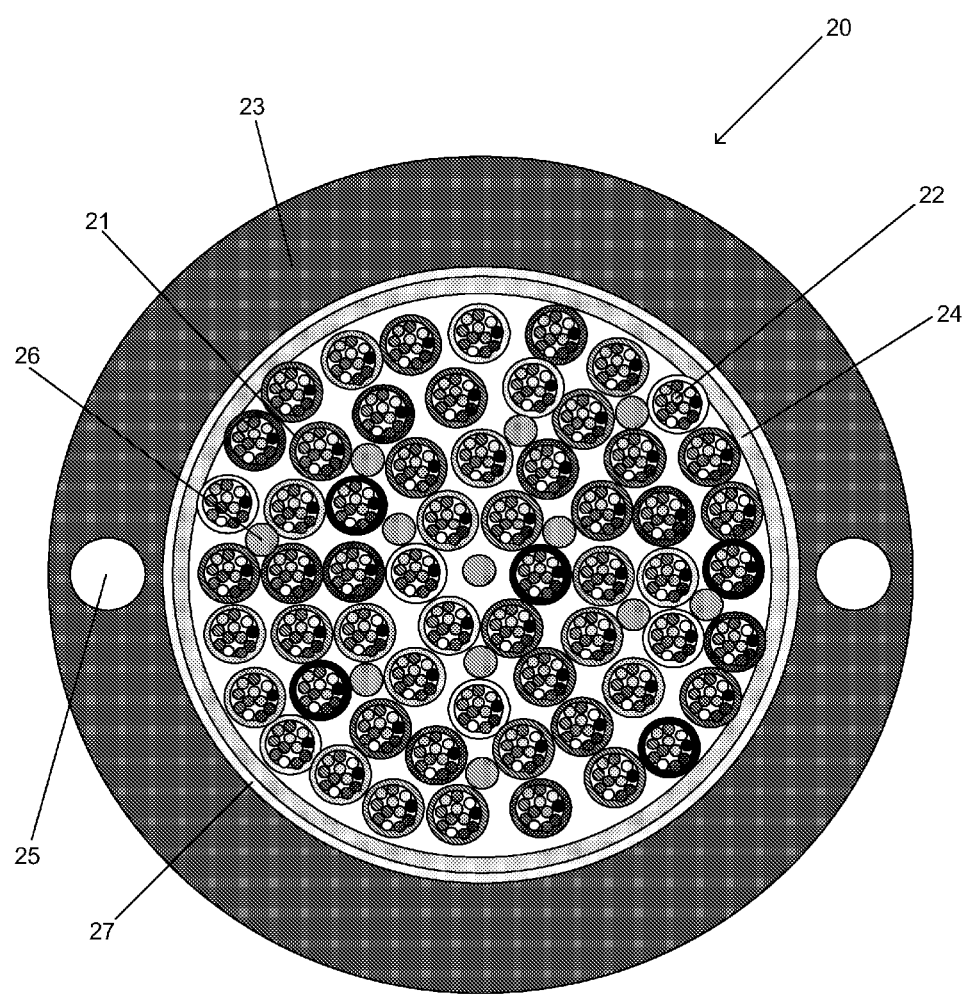

OPTICAL-FIBER CABLE HAVING HIGH FIBER COUNT AND HIGH FIBER DENSITY

CROSS-REFERENCE TO PRIORITY APPLICATION

This application claims the benefit of commonly assigned U.S. Patent Application No. 61/252,951, for an Optical-Fiber Cable Having High Fiber Count and High Fiber Density (filed Oct. 19, 2009), which is hereby incorporated by reference in its entirety.

FIELD OF THE INVENTION

The present invention embraces reduced-diameter optical-fiber cables, such as optical-fiber cables having a high fiber count and a high fiber density.

BACKGROUND OF THE INVENTION

As compared with traditional wire-based networks, optical-fiber communication networks are capable of transmitting significantly more information at significantly higher speeds. Optical fibers, therefore, are being increasingly employed in communication networks.

To expand total transmission throughput, optical-fiber network providers are attempting to place ever more optical fibers in ever-smaller spaces. Packing fibers into tight spaces, however, can cause undesirable attenuation. Indeed, there is an inherent trade-off between increased fiber density and signal attenuation.

Fiber optic cables are commonly deployed in ducts (e.g., ducts having an outer diameter of about 42 millimeters). Traditional duct installation, however, uses space inefficiently. The typical capacity of such ducts has been one cable per duct, although in some cases two cables have been installed.

In this regard, it is desirable to achieve optical-fiber cables having a reduced diameter such that multiple (e.g., three) optical-fiber cables can be installed in a duct. It is also desirable to achieve optical-fiber cables having a high fiber density. Moreover, it is desirable to achieve high-fiber-density optical-fiber cables having satisfactory attenuation performance.

Additionally, it is desirable for optical-fiber cables deployed in ducts to be robust enough to withstand mechanical stresses that may occur during installation. Such optical-fiber cables should also be able to withstand conditions of use over a wide temperature range, such as between about –20° C. and 50° C. Indeed, it is desirable for optical-fiber cables to be able to withstand an even wider temperature range, such as between about –40° C. and 70° C.

SUMMARY OF THE INVENTION

It is an object of the present invention to provide a reduced-diameter optical-fiber cable having a high fiber count and a high fiber density.

It is another object of the present invention to provide a reduced-diameter optical-fiber cable having a cable jacket formed of a material with a low coefficient of friction, thereby allowing three reduced-diameter optical-fiber cables to be concurrently pulled over 300 meters through a cable duct having an inner diameter of about 42 millimeters.

It is another object of the present invention to provide a high-fiber-density optical-fiber cable having satisfactory crush resistance.

It is another object of the present invention to provide a high-fiber-density optical-fiber cable having an operating temperature between about –30° C. and 60° C.

It is another object of the present invention to provide a high-fiber-density optical-fiber cable having a storage temperature between about –40° C. and 70° C.

It is another object of the present invention to provide a reduced-diameter optical-fiber cable (e.g., a cable having an outer diameter of about 16 millimeters or less) that includes at least about 720 optical fibers.

It is another object of the present invention to provide a reduced-diameter optical-fiber cable (e.g., a cable having an outer diameter of about 17 millimeters or less) that includes at least about 864 optical fibers.

It is another object of the present invention to provide high-fiber-density optical-fiber cables that are capable of efficient installation into ducts.

The foregoing illustrative summary, as well as other exemplary objectives and/or advantages of the invention, and the manner in which the same are accomplished, are further explained within the following detailed description and its accompanying drawing.

BRIEF DESCRIPTION OF THE DRAWING

FIG. 1 schematically depicts an exemplary high count, high-fiber-density cable in accordance with the present invention.

DETAILED DESCRIPTION

The present invention embraces a high-fiber-density optical-fiber cable.

The high-fiber-density cable includes a plurality of low-modulus buffer tubes (i.e., low-modulus micromodules, microsheaths, or "flextubes"), each of which may contain a plurality of optical fibers. Typically, the high-fiber-density cable includes between about 30 and 60 flextubes (e.g., 36 or 48 flextubes). Exemplary flextubes may contain 12, 18, or 24 optical fibers.

Typically, the flextubes are formed from a polymeric material having a Young's modulus of less than about 500 megapascals (MPa) (e.g., 300 MPa or less), typically less than about 250 MPa (e.g., 200 MPa or less, such as 50 MPa to 150 MPa), and more typically less than about 100 MPa. To achieve a Young's modulus less than about 100 MPa, exemplary flextubes may be formed from a thermoplastic copolyester elastomer.

For example, the flextubes may be formed from a material having a Young's modulus of between about 10 MPa and 90 MPa (e.g., 25 MPa to 75 MPa). For example, in some embodiments, the flextubes may be formed from a material having a Young's modulus greater than about 50 MPa. In other embodiments, the flextubes may be formed from a material having a Young's modulus of less than 50 MPa, such as between about 20 MPa and 40 MPa (e.g., between about 25 MPa and 30 MPa).

Moreover, the flextubes typically have a relatively thin wall with a thickness of between about 0.1 millimeter (mm) and 0.2 millimeter. In one embodiment, the flextubes have a wall thickness of about 0.15 millimeter or less. These flextubes can be readily accessed without special tools.

The flextubes may have an outer diameter of between about one millimeter and two millimeters. Typically, the flextubes have an outer diameter less than about 1.5 millimeters, such as between about 1.0 millimeter and 1.3 millimeters.

The present flextubes have a relatively high micromodule filling coefficient. As used herein, the term "micromodule filling coefficient" refers to the ratio of the total cross-sectional area of the fibers within a micromodule versus the inner cross-sectional area of that micromodule (i.e., defined by the inner boundary of the micromodule).

Optical-fiber cables of the present invention include flextubes typically having a micromodule filling coefficient greater than 0.5, such as greater than 0.65 (e.g., about 0.7). For example, a flextube (i) having an outer diameter of about 1.13 millimeters and an inner diameter of about 0.83 millimeter and (ii) containing twelve (12) 200-micron optical fibers would have a micromodule filling coefficient of about 0.7. A flextube (i) having an outer diameter of about 1.3 millimeters and an inner diameter of about 1.0 millimeter and (ii) containing twelve (12) 242-micron optical fibers would also have a micromodule filling coefficient of about 0.7.

Additionally, as used herein, the term "cumulative micromodule filling coefficient" refers to the ratio of the total cross-sectional area of the optical fibers enclosed within micromodules versus the sum of the inner cross-sectional areas of the micromodules containing those optical fibers.

A cable jacket surrounds the flextubes. In an exemplary embodiment, the cable jacket is formed of a polyolefin, such as polyethylene or polypropylene. Polyethylene, for instance, has a relatively low coefficient of friction, which allows it to be easily pulled through a cable duct. Other exemplary polymers that may be used to form the cable jacket include fluoropolymers, such as polyvinyl fluoride (PVF) or polyvinylidene difluoride (PVDF).

The material used to form the cable jacket may include additives such as nucleating agents, antioxidants, UV absorbers, and carbon black.

The cable jacket typically has an outer diameter of less than about 18 millimeters, typically less than about 17.5 millimeters, such as less than about 16 millimeters (e.g., about 14 millimeters). Those having ordinary skill in the art will appreciate that the outer diameter of the cable jacket depends upon the respective characteristics of the optical fibers and/or micromodules (e.g., numbers and dimensions) enclosed within the interior space defined by the cable jacket.

To ensure that the high-fiber-density cable has adequate crush resistance, in one embodiment the cable jacket has an average thickness of at least about two millimeters (e.g., about 2.2 millimeters). For example, a high-fiber-density cable having an outer diameter of about 16 millimeters would have an inner diameter of no more than about 12 millimeters. Alternatively, to the extent that crush resistance and/or tensile strength is less of a concern, the thickness of the cable jacket can be further reduced.

Accordingly, the present high-fiber-density cable complies with the IEC 60794-1-2 (method E3) and the IEC 60794-3-10 standards with regard to crush resistance. The IEC 60794-1-2 (method E3) and the IEC 60794-3-10 standards are hereby incorporated by reference in their entirety.

In addition, the optical-fiber cables in accordance with the present invention typically meet or exceed other International Electrotechnical Commission standards as set forth in the IEC 60794 standard, such as tensile strength (IEC 60794-1-2-E1), impact (IEC 60794-1-2-E4), torsion (IEC 60794-1-2-E7), bending (IEC 60794-1-2-E11), temperature cycling (IEC 60794-1-2-F1), and water tightness (IEC 60794-1-2-F5). These IEC 60794 standards are hereby incorporated by reference in their entirety.

The cable jacket typically includes one or more radial strength members (RSMs). For example, fiberglass reinforcing rods (e.g., glass-reinforced plastic (GRP)) may be incorporated into the cable jacket. The radial strength members typically have a total cross-sectional area so as to ensure that the cable jacket contracts (i.e., shrinks) less than about 0.5 percent at minimum operating temperatures (e.g., at about −30° C.).

In this regard, exemplary radial strength members may have a diameter of between about 1.0 millimeter and 1.8 millimeters, such as about 1.4 millimeters. The strength members are typically positioned (e.g., embedded) within the cable jacket so that at least 0.4 millimeter of the jacket concentrically surrounds the strength member. In other words, the strength members are typically positioned at least 0.4 millimeter from both the inner and outer surfaces of the cable jacket. This positioning of the strength members ensures that the cable jacket does not "zipper" (i.e., open) along the strength members when the high-fiber-density cable is twisted or bent. As will be appreciated by those having ordinary skill in the art, zippering may occur when the mechanical integrity of the cable jacket is compromised after sufficient deterioration of the cable jacket. Accordingly, zippering may result in additional optical-fiber attenuation and possibly even mechanical damage to the enclosed optical fibers.

Within the cable jacket, the plurality of flextubes are typically stranded about each other to form a flexible stranded core. Such stranding can be accomplished in one direction (e.g., "S" helical stranding or "Z" helical stranding). In this regard, it has been observed that helical stranding helps to equalize the response of each flextube when the cable is subjected to bending. Alternatively, Reverse Oscillated Lay stranding, known as "S-Z" stranding, may be employed instead.

In another cable embodiment, the stranded core may be formed from multiple stranded elements that are stranded about each other. For example, each stranded element may include a plurality of flextubes (e.g., three, four, six, or twelve flextubes) stranded about each other.

One or more layers of high-strength yarns (e.g., aramid or non-aramid yarns) may be positioned parallel to or wrapped (e.g., contrahelically) around the stranded flextubes. Water-swellable tape may also be wrapped around the stranded flextubes. In some embodiments, the high-strength yarns and/or water-swellable tape may be secured with one or more binder threads. Ripcords may be placed inside (e.g., immediately beneath) the cable jacket.

The stranding lay length of the stranded flextubes is typically equal to at least about 30 times the theoretical stranded-core diameter, but no more than about 40 times the outer diameter of the reduced-diameter cable.

As used herein, the term "stranding lay length" refers to the longitudinal distance along the reduced-diameter cable in which the stranded flextubes complete one helical wrap.

Moreover, as used herein, the term "theoretical stranded-core diameter" refers to the diameter of the most compact configuration possible for arranging circular flextubes in layers.

By way of example, for a high-fiber-density cable having an outer diameter of about 16 millimeters, an inner diameter of about 12 millimeters, and a theoretical stranded-core diameter of about 11 millimeters, the flextubes' stranded lay length should be between about 330 millimeters and 640 millimeters.

By way of further example and as depicted in FIG. 1, 60 flextubes may be arranged in a 0-6-12-18-24 configuration (i.e., a configuration having concentric circles of 0, 6, 12, 18, and 24 flextubes). Such a configuration has a theoretical stranded-core diameter equal to nine times (9×) the diameter of the flextubes.

In an alternative embodiment, 48 flextubes may be arranged in a 3-9-15-21 configuration, which has a theoretical stranded-core diameter equal to about eight times (8×) the diameter of the flextubes.

With respect to the present high-fiber-density cable, yarns, nonwovens, fabrics (e.g., tapes), foams, or other materials containing water-swellable material and/or coated with water-swellable materials (e.g., including super absorbent polymers (SAPs), such as SAP powder) may be employed within the cable to provide water blocking.

In one embodiment, the flextubes themselves may include filling greases or lubricants (e.g., thixotropic filling greases) to promote water tightness. Alternatively, the high-fiber-density cable may include dry structures (i.e., grease-free flextubes).

The present high-fiber-density cable has a relatively high fiber density. As used herein, the term "cable fiber density" of an optical-fiber cable refers to the ratio of the total number of optical fibers within the optical-fiber cable versus the cross-sectional area of the optical-fiber cable as defined by the outer boundary (e.g., the outer diameter) of the protective outer jacket. Optical-fiber cables having higher cable fiber densities are desired, because such high-fiber-density cables have an increased number of optical fibers and/or require less space for installation.

The high-fiber-density cable in accordance with the present invention has a cable fiber density of at least about 2.0 fibers/mm$^2$ (e.g., 2.1-2.3 fibers/mm$^2$), typically at least about 2.4 fibers/mm$^2$ (e.g., 2.45-2.75 fibers/mm$^2$), and more typically at least about 2.85 fibers/mm$^2$ (e.g., 3.0-3.6 fibers/mm$^2$). In some embodiments, the present high-fiber-density cable has a cable fiber density of at least about 4.0 fibers/mm$^2$ (e.g., about 4.25), and perhaps 4.5 fibers/mm$^2$ or higher.

In this regard, reducing the thickness of the cable jacket will reduce cable diameter, thereby increasing cable fiber density. Higher cable fiber densities may be achieved, for example, by modifying (e.g., reducing) the cross-sections of the radial strength members. In some cable embodiments, it might be possible to exclude radial strength members altogether.

Moreover, as used herein, the term "inner cable fiber density" of an optical-fiber cable refers to the ratio of the total number of optical fibers within the optical-fiber cable versus the inner cross-sectional area of the optical-fiber cable as defined by the inner boundary (e.g., the inner diameter) of the protective outer jacket.

Typically, the high-fiber-density cable in accordance with the present invention has an inner cable fiber density of at least about 3.5 fibers/mm$^2$, more typically at least about 5.0 fibers/mm$^2$, such as about 6.0 fibers/mm$^2$ or more (e.g., about 7.0-7.5 fibers/mm$^2$).

In one exemplary embodiment, the high-fiber-density cable in accordance with the present invention has a cable fiber density of at least about 2.4 fibers/mm$^2$ (e.g., 2.5-2.7 fibers/mm$^2$). Typically, the high-fiber-density cable has a cable fiber density of at least about 2.8 fibers/mm$^2$, such as about 3.5 fibers/mm$^2$ or more. For example, a high-fiber-density cable, having an outer diameter of about 16 millimeters and containing 720 optical fibers having an outer diameter of about 200 microns, would have a cable fiber density of about 3.58 fibers/mm$^2$.

The 720 optical fibers may, for example, be contained in 60 flextubes containing 12 optical fibers or in 30 flextubes containing 24 optical fibers. By way of further example, a high-fiber-density cable (i) having an outer diameter of about 14 millimeters and (ii) containing 432 optical fibers, each having an outer diameter of about 200 microns, would have a cable fiber density of about 2.81 fibers/mm$^2$.

In accordance with the present invention, Table 1 (below) depicts various cable embodiments deploying 200-micron optical fibers:

TABLE 1

|  | Ex. 1 | Ex. 2 | Ex. 3 | Ex. 4 | Ex. 5 | Ex. 6 |
|---|---|---|---|---|---|---|
| flextubes per cable | 72 | 60 | 48 | 36 | 36 | 30 |
| flextube outer diameter (mm) | 1.13 | 1.13 | 1.13 | 1.13 | 1.3 | 1.53 |
| flextube inner diameter (mm) | 0.85 | 0.85 | 0.85 | 0.85 | 1.03 | 1.26 |
| fibers per flextube | 12 | 12 | 12 | 12 | 18 | 24 |
| optical fibers per cable | 864 | 720 | 576 | 432 | 648 | 720 |
| optical fiber diameter (μm) | 200 | 200 | 200 | 200 | 200 | 200 |
| cable outer diameter (mm) | 17.1 | 15.9 | 14.9 | 13.6 | 14.8 | 15.5 |
| cable inner diameter (mm) | 12.7 | 11.4 | 10.4 | 9.1 | 10.3 | 11 |
| cable fiber density (fibers/mm$^2$) | 3.76 | 3.63 | 3.30 | 2.97 | 3.77 | 3.82 |
| inner cable fiber density (fibers/mm$^2$) | 6.82 | 7.05 | 6.78 | 6.64 | 7.78 | 7.58 |
| cumulative micromodule filling coefficient | 0.66 | 0.66 | 0.66 | 0.66 | 0.68 | 0.61 |

In accordance with the present invention, Table 2 (below) depicts various cable embodiments deploying 242-micron optical fibers:

TABLE 2

|  | Ex. 1 | Ex. 2 | Ex. 3 | Ex. 4 | Ex. 5 |
|---|---|---|---|---|---|
| flextubes per cable | 72 | 60 | 48 | 36 | 30 |
| flextube outer diameter (mm) | 1.3 | 1.3 | 1.4 | 1.3 | 1.8 |
| flextube inner diameter (mm) | 1.03 | 1.03 | 1.1 | 1.03 | 1.49 |
| fibers per flextube | 12 | 12 | 12 | 12 | 24 |
| optical fibers per cable | 864 | 720 | 576 | 432 | 720 |
| optical fiber diameter (μm) | 242 | 242 | 242 | 242 | 242 |
| cable outer diameter (mm) | 18.9 | 17.4 | 17.1 | 14.8 | 17.2 |
| cable inner diameter (mm) | 14.4 | 12.9 | 12.6 | 10.3 | 12.8 |

TABLE 2-continued

|  | Ex. 1 | Ex. 2 | Ex. 3 | Ex. 4 | Ex. 5 |
|---|---|---|---|---|---|
| cable fiber density (fibers/mm$^2$) | 3.08 | 3.03 | 2.51 | 2.51 | 3.10 |
| inner cable fiber density (fibers/mm$^2$) | 5.31 | 5.51 | 4.62 | 5.19 | 5.60 |
| cumulative micromodule filling coefficient | 0.66 | 0.66 | 0.58 | 0.66 | 0.63 |

FIG. 1 depicts an exemplary high-fiber-density cable 20 in accordance with the present invention. The high-fiber-density cable 20 includes sixty (60) stranded flextubes 21, each having twelve (12) optical fibers 22. Accordingly, as depicted in FIG. 1, the high-fiber-density cable 20 includes 720 optical fibers 22. The high-fiber-density cable 20 also contains water-swellable yarns 26, which may be positioned between and helically stranded with the flextubes 21. Water-swellable tape 24 and aramid yarns 27 surround the flextubes 21. A cable jacket 23 encloses the flextubes 21, the water-swellable tape 24, and the aramid yarns 27. As depicted in FIG. 1, the aramid yarns 27 are typically positioned between the water-swellable tape 24 and the cable jacket 23. Two radial strength members 25 are incorporated into the cable jacket 23.

The high-fiber-density cables according to the present invention are capable of achieving outstanding attenuation performance. In this regard, the attenuation of reduced-diameter cables may be evaluated via temperature-cycle testing. For example, a section of cable (e.g., a cable section of between about 1000 meters and 2000 meters) may be temperature cycled from −40° C. to 70° C. This temperature cycling is typically performed twice on the cable section.

Alternatively, more rigorous temperature cycling may be performed. For example, a section of the high-fiber-density cable may temperature cycled twice from −40° C. to 70° C., then aged for about five days at 85° C., then temperature cycled once from −40° C. to 70° C.

As used herein and unless otherwise specified, reference to "temperature cycling," "cable temperature cycling," "temperature cycle testing," or the "temperature cycle test" refers to the testing procedures set forth in Table 3 (below). In particular, Table 3 depicts the approximate temperature and soak time of the various steps of the foregoing temperature cycle testing.

TABLE 3

| Temperature (° C.) | Approximate Soak Time (hours) |
|---|---|
| 20 | initial |
| −20 | 15-25 |
| −30 | 15-25 |
| −40 | 15-25 |
| 60 | 15-25 |
| 70 | 65-75 |
| −20 | 15-25 |
| −30 | 20-30 |
| −40 | 20-30 |
| 70 | 15-20 |
| 20 | 110-120 |
| 85 | 120-130 |
| −20 | 15-25 |
| −40 | 15-25 |
| 70 | 15-20 |
| 20 | final |

During and after temperature cycling, the attenuation of the optical fibers contained within the high-fiber-density cable is measured. For single-mode optical fibers, attenuation is often measured at wavelengths of 1550 nanometers (nm) and 1625 nanometers. It is desirable that the optical fibers contained within the present high-fiber-density cable experience an increase in attenuation (i.e., added loss) of no more than about 0.1 dB/km (e.g., less than about 0.05 dB/km, such as less than about 0.03 dB/km) during temperature cycling.

Temperature cycle testing may also be performed in accordance with IEC 60794-1-2 Method F1, which, as noted, is incorporated by reference. In accordance with IEC 60794-1 Method F1, the optical fibers within the present high-fiber-density cable typically experience an increase in attenuation of no more than about 0.1 dB/km.

The high-fiber-density optical-fiber cables according to the present invention typically employ a plurality of single-mode optical fibers.

In one embodiment, conventional standard single mode fibers are employed in the high-fiber-density optical-fiber cables according to the present invention. Suitable single-mode optical fibers (SSMF) that are compliant with the ITU-T G.652.D standard are commercially available, for instance, from Draka (Claremont, N.C.).

In another embodiment, bend-insensitive fibers are employed in the high-fiber-density optical-fiber cables according to the present invention. Bend-insensitive optical fibers are less susceptible to attenuation (e.g., caused by macrobending and/or microbending).

Exemplary single-mode glass fibers for use in the present high-fiber-density optical-fiber cables are commercially available from Draka (Claremont, N.C.) under the trade name BendBright®, which is compliant with the ITU-T G.652.D standard. That said, it is within the scope of the present invention to employ a bend-insensitive glass fiber that meets the ITU-T G.657.A standard and/or the ITU-T G.657.B standard. The ITU-T G.652.D and ITU-T G.657.A/B standards are hereby incorporated by reference in their entirety.

In this regard, exemplary bend-insensitive single-mode glass fibers for use in the present invention are commercially available from Draka (Claremont, N.C.) under the trade name BendBright$^{XS}$®. BendBright$^{XS}$® optical fibers, which are compliant with both the ITU-T G.652.D and ITU-T G.657.A/B standards, demonstrate significant improvement with respect to both macrobending and microbending.

Optical fibers typically have an outer diameter of between about 235 microns and 265 microns. The component glass fiber itself (i.e., the glass core and surrounding cladding layers) may have an outer diameter of about 125 microns, such that the total coating thickness is between about 55 microns and 70 microns.

With respect to the optical fiber's surrounding coating layers, the primary coating may have an outer diameter of between about 175 microns and 195 microns (i.e., a primary coating thickness of between about 25 microns and 35 microns) and the secondary coating may have an outer diameter of between about 235 microns and 265 microns (i.e., a secondary coating thickness of between about 20 microns and 45 microns). Optionally, the optical fiber may include an outermost ink layer, which is typically between two and ten microns in thickness.

That said, optical fibers having a smaller diameter (e.g., an outermost diameter between about 150 microns and 230 microns) are within the scope of the present invention. In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

The single-mode optical fibers included within the present high-fiber-density optical-fiber cables typically have a MAC value of less than about 7.4 at a wavelength 1310 nanometers. An optical fiber's MAC value is defined as the ratio of the mode field diameter of the fiber at 1310 nanometers over the effective cut-off wavelength $\lambda_{ceff}$. The cut-off wavelength is conventionally measured as the wavelength at which the optical signal is no longer single mode after propagation over two meters of fiber, as defined by Subcommittee 86A of the International Electrotechnical Commission in the IEC 60793 1-44 standard. The MAC value constitutes a parameter for assessing the performance of an optical fiber with respect to the fiber's mode field diameter, effective cut off wavelength, and bending losses.

The present high-fiber-density cable has been described herein with respect to single-mode optical fibers. That said, and without being bound by any theory, it is thought that the present cable design might be employed using multimode optical fibers (e.g., 50-micron-core multimode optical fibers that comply with the ITU-T G.651 standard). The ITU-T G.651 standard is hereby incorporated by reference in its entirety.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for a Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); U.S. patent application Ser. No. 12/884,834 for a Multimode Optical Fiber, filed Sep. 17, 2010, (Molin et al.); and U.S. patent application Ser. No. 12/887,813 for a Optical Fiber for Sum-Frequency Generation, filed Sep. 22, 2010, (Richard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); U.S. patent application Ser. No. 12/881,598 for Methods and Devices for Cable Insertion into Latched Conduit, filed Sep. 14, 2010, (Leatherman et al.); and U.S. patent application Ser. No. 12/907,241 for a High-Fiber-Density Optical-Fiber Cable, filed Oct. 19, 2010, (Overton et al.).

In the specification and/or FIGURE, typical embodiments of the invention have been disclosed. The present invention is not limited to such exemplary embodiments. The use of the term "and/or" includes any and all combinations of one or more of the associated listed items. The FIGURE is a schematic representation and so is not necessarily drawn to scale. Unless otherwise noted, specific terms have been used in a generic and descriptive sense and not for purposes of limitation.

The invention claimed is:

1. An optical-fiber cable, comprising:
a plurality of micromodules positioned within and surrounded by a polymeric cable jacket, one or more of said micromodules enclosing a plurality of optical fibers;
wherein the optical-fiber cable possesses an inner cable fiber density of at least about 3.75 fibers/mm$^2$;
wherein one or more of said micromodules comprise polymeric material having a Young's modulus of 500 MPa or less; and
wherein the optical-fiber cable possesses a cumulative micromodule filling coefficient of at least 0.5.

2. An optical-fiber cable according to claim 1, wherein one or more of said micromodules comprise polymeric material having a Young's modulus of between about 50 MPa and 250 MPa.

3. An optical-fiber cable according to claim 1, wherein one or more of said micromodules comprise polymeric material having a Young's modulus of less than about 100 MPa.

4. An optical-fiber cable according to claim 1, wherein one or more of said micromodules possess a micromodule filling coefficient of at least about 0.65.

5. An optical-fiber cable according to claim 1, wherein one or more of said optical fibers possess an outer diameter of less than about 210 microns.

6. An optical-fiber cable according to claim 1, wherein the optical-fiber cable possesses a cable fiber density of at least about 2.6 fibers/mm$^2$.

7. An optical-fiber cable according to claim 1, wherein the optical-fiber cable possesses a cable fiber density of at least about 2.85 fibers/mm$^2$.

8. An optical-fiber cable according to claim 1, wherein the optical-fiber cable possesses a cable fiber density of at least about 3.25 fibers/mm$^2$.

9. An optical-fiber cable according to claim 1, wherein the optical-fiber cable possesses a cable fiber density of at least about 4.5 fibers/mm$^2$.

10. An optical-fiber cable according to claim 1, wherein the optical-fiber cable possesses an inner cable fiber density of at least about 5.0 fibers/mm$^2$.

11. An optical-fiber cable according to claim 1, wherein the optical-fiber cable possesses an inner cable fiber density of at least about 7.0 fibers/mm$^2$.

12. An optical-fiber cable according to claim 1, wherein the optical-fiber cable complies with the crush-resistance standard set forth in IEC 60794-1-2 (method E3).

13. An optical-fiber cable according to claim 1, wherein the optical-fiber cable complies with the crush-resistance standard set forth in IEC 60794-3-10.

14. An optical-fiber cable, comprising:
a polymeric cable jacket; and
a plurality of micromodules positioned within said polymeric cable jacket, wherein said micromodules are formed from a polymeric material having a Young's modulus of less than about 300 MPa;
wherein the optical-fiber cable possesses a cable fiber density of at least about 2.4 fibers/mm$^2$; and
wherein one or more of said micromodules possess a micromodule filling coefficient of at least about 0.5.

15. An optical-fiber cable according to claim 14, wherein one or more of said micromodules comprise polymeric material having a Young's modulus of between about 50 MPa and 150 MPa.

16. An optical-fiber cable according to claim 14, wherein one or more of said micromodules comprise polymeric material having a Young's modulus of between about 10 MPa and 90 MPa.

17. An optical-fiber cable according to claim 14, wherein one or more of said micromodules comprise polymeric material having a Young's modulus of between about 20 MPa and 40 MPa.

18. An optical-fiber cable according to claim 1, wherein the optical-fiber cable possesses a cumulative micromodule filling coefficient of at least about 0.65.

19. An optical-fiber cable according to claim 14, wherein the optical-fiber cable possesses a cumulative micromodule filling coefficient of at least about 0.6.

20. An optical-fiber cable according to claim 14, wherein the optical-fiber cable possesses a cable fiber density of at least about 2.85 fibers/mm$^2$.

21. An optical-fiber cable according to claim 14, wherein the optical-fiber cable possesses a cable fiber density of at least about 4.0 fibers/mm$^2$.

22. An optical-fiber cable according to claim 14, wherein the optical-fiber cable possesses an inner cable fiber density of at least about 4.0 fibers/mm$^2$.

23. An optical-fiber cable according to claim 14, wherein the optical-fiber cable possesses an inner cable fiber density of at least about 5.5 fibers/mm$^2$.

24. An optical-fiber cable according to claim 15, wherein the optical-fiber cable possesses an inner cable fiber density of at least about 7.5 fibers/mm$^2$.

25. An optical-fiber cable, comprising:
at least 720 optical fibers, each said optical fiber having an outer diameter of between about 190 microns and 210 microns;
a plurality of micromodules, each said micromodule surrounding one or more of said optical fibers such that each of said optical fibers is positioned within one of said micromodules; and
a substantially circular cable jacket surrounding said plurality of micromodules, said cable jacket having an outer diameter of about 16 millimeters or less;
wherein one or more of said micromodules comprise polymeric material having a Young's modulus of 500 MPa or less; and wherein the optical-fiber cable possesses a cumulative micromodule filling coefficient of at least 0.6.

26. An optical-fiber cable according to claim 25, wherein one or more of said micromodules comprise polymeric material having a Young's modulus of between about 25 MPa and 75 MPa.

27. An optical-fiber cable according to claim 25, wherein the optical-fiber cable possesses a cable fiber density of at least about 2.85 fibers/mm$^2$.

28. An optical-fiber cable according to claim 25, wherein the optical-fiber cable possesses an inner cable fiber density of at least about 3.75 fibers/mm$^2$.

29. An optical-fiber cable according to claim 25, wherein the optical-fiber cable complies with the crush-resistance standard set forth in IEC 60794-1-2 (method E3) and/or the crush-resistance standard set forth in IEC 60794-3-10.

* * * * *